Figure 1:
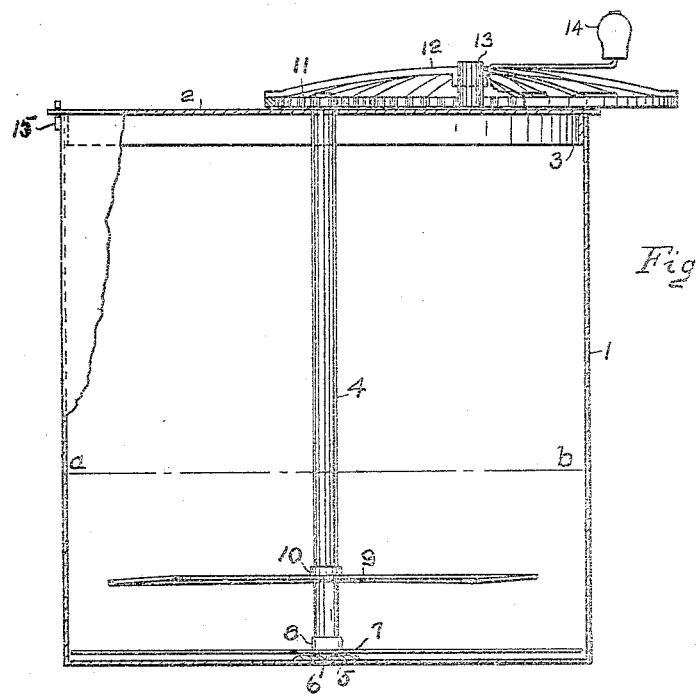

C. M. NULF & G. M. JACKSON.
APPARATUS FOR TREATING BUTTER.
APPLICATION FILED MAR. 19, 1909.

940,716.  Patented Nov. 23, 1909.

WITNESSES:
Isaac N. Taylor
Helen F. Glenn

INVENTORS.
Clarence M. Nulf and
George M. Jackson
BY
Elwin M. Hulse
Their ATTORNEY.

UNITED STATES PATENT OFFICE.

CLARENCE M. NULF AND GEORGE M. JACKSON, OF FRANKTON, INDIANA.

APPARATUS FOR TREATING BUTTER.

940,716.   Specification of Letters Patent.   Patented Nov. 23, 1909.

Application filed March 19, 1909. Serial No. 484,527.

*To all whom it may concern:*

Be it known that we, CLARENCE M. NULF and GEORGE M. JACKSON, citizens of the United States, and residents of Frankton, in the county of Madison and State of Indiana, have invented a new and useful Improvement in Apparatus for Treating Butter, of which the following is a specification.

Our invention relates to apparatus by which butter may be commingled with milk or cream to produce what is known as merged butter. In treating butter in this manner it is essential to break or cut up as many of the fat globules of the butter as possible so that the particles will readily absorb or take up the liquid. At the same time it is desirable to hold down the butter in proximity to the breaking or cutting device so that all parts thereof may be effectively acted upon by that device.

The object of this invention is to provide a device which shall operate to produce the desired product in a highly efficient and economical manner, and it consists in a novel construction and arrangement of cutting and depressing blades revolubly supported in a suitable retaining vessel by which the butter fat globules are effectively broken or cut up, the butter being constantly depressed in the vessel.

In the drawing we illustrate one manner of carrying out our invention in practice, in which—

Figure 2:
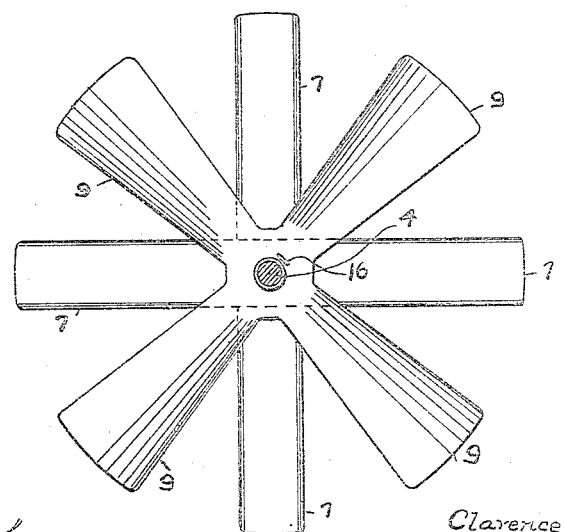

Figure 1 is a sectional elevation of the assembled device and Fig. 2, a sectional plan view of the revoluble operating mechanism on the line *a—b*.

Referring to the drawings 1 indicates a suitable vessel having a removable top or cover 2, which top has the usual inner depending flange 3 which is adapted to engage the inner periphery of the vessel. In the center of the bottom 1 is fixed a suitable bearing for the lower extremity of shaft 4. The drawing illustrates the lower end of shaft 4 as seated in a corresponding recess formed in the upper face of bearing 5. Any suitable bearing will suffice for our purpose, the intent being to furnish a means in the vessel bottom by which transverse movement of shaft 4 will be obviated. The upper extremity of shaft 4 extends through a suitable opening in top 2 and is adapted to carry a pinion 11. Adjacent to the lower end of shaft 4 is fixed one or more preferably thin radiating breaking or cutting blades 7. In Fig. 2 the blades are shown, four in number, radiating from an annular ring or collar 8, which is fixed to the shaft. These blades should be fixed to the shaft so that they will be quite close to the bottom of vessel 1. Each blade 7 is sharpened along at least one edge; or both side edges of each blade may be sharpened in order to provide cutting edges for the blades so that the butter fat globules will be cut up into very fine particles, as the blades are revolved in vessel 1.

It is essential to provide means within the vessel to keep the butter down in the lower portion of the vessel in order that blades 7 shall effectively operate on the same, and to accomplish this we mount on shaft 4, a suitable distance above blades 7, another blade or set of blades 9, which radiate from an annular ring or collar 10. These blades have one or both sides curved upwardly, or each blade may be slightly twisted or inclined upwardly so that at least one side edge thereof is slightly elevated above the opposite edge. This slight curvature or inclination of blades 9 is provided so that those blades shall ride on the top of the butter and tend to press the same downwardly toward blades 7. We prefer to arrange blades 9 in staggered relation with respect to blades 7, as shown in the drawings, as in that position they are very effective in forcing the butter downwardly in vessel 1. Blades 9 may be permanently fixed on shaft 4 at the desired point thereon, or, if desired, may be adjustable on shaft 4 by providing a thumb screw 16 in ring or collar 10 which is adapted to impinge on shaft 4 and hold the blades tight on said shaft at any desired position.

On top 2 we provide a pivot 13 over which is engaged a suitable female gear 12 which gear meshes with pinion 11 and is provided with crank 14, by all of which shaft 4 and the two sets of blades are revolved within vessel 1. Any suitable means for revolving shaft 4 will suffice for our purpose, hence we do not wish to be limited to the particular driving means shown. The cover 2 may be locked to vessel 1 in any suitable manner as by one or more catches 15, which catch is a hook fixed to vessel 1 and is adapted to engage a notch in cover 2.

In operation, predetermined amounts of butter and milk or cream are placed in vessel 1, the elevation of blades 9 being such as to bear against the surface of the butter. Shaft 4, with its blades 7 and 9, may be inserted either before or after the materials are added. When the materials and shaft are in the vessel the cover is put on and pinion 11 and gear 12 are placed on their respective supports, and the rotation of the shaft is all that remains to be done to commingle and merge the butter and liquid into a solid mass. The resultant product has practically all the characteristics of the original butter and is increased in volume according to the quantity of the two materials used. For example, if one pound of butter and a pint of fresh milk or cream are placed in the vessel, the product will weigh practically two pounds, the liquid being entirely absorbed by the butter.

It is apparent that any number of cutting blades may be provided on shaft 4, their only function being to cut or break up the fat globules of the butter, the upper blades serving at all times to depress and keep the butter down so that it will be effectively acted upon by the lower cutting blades. It is also apparent that since the rotating parts are all removable from the vessel the device is very easily and thoroughly cleaned throughout, thus rendering it exceedingly sanitary in all its parts.

What we claim is:

1. A device of the class described comprising a vessel, a cutting blade and a depressing blade revolubly supported therein, and means supported on the vessel for imparting motion to both blades.

2. A device of the class described comprising a vessel, a thin blade having a sharp cutting edge within the vessel, a depressing blade above the cutting blade, and means supported by the vessel for imparting a revoluble motion to both blades.

3. A device of the class described comprising a vessel, a shaft revolubly and vertically supported therein, a thin blade having a sharp cutting edge mounted on the shaft, a depressing blade supported on the shaft above the cutting blade, and means supported by the vessel and connected to the shaft for imparting a revoluble motion to the shaft and blades.

4. A device of the class described comprising a vessel, a revoluble shaft vertically supported therein, a cutting blade radially mounted on said shaft, a depressing blade radially supported on said shaft and having its lower face curved upwardly, and means supported on the vessel and connected to the shaft whereby a revoluble motion is imparted to the shaft and blades.

5. A device of the class described comprising a vessel, a shaft vertically disposed therein and removable therefrom, a plurality of cutting blades mounted adjacent to the lower extremity of the shaft and radiating therefrom, a plurality of depressing blades supported on the shaft at a point above the cutting blades and radiating from said shaft, said blades having their under surfaces slightly curved upwardly, a pinion on the upper extremity of the shaft, and means operatively connected to said pinion and supported on the vessel whereby said shaft and its blades are rotated within the vessel.

6. A device of the class described comprising a vessel, a shaft vertically and revolubly supported therein, a plurality of cutting blades fixed to and radiating from the shaft, a plurality of depressing blades supported on the shaft and radiating therefrom in staggered relation with respect to the cutting blades, and means supported on the vessel by which the shaft may be revolved.

7. A device of the class described comprising a vessel, a shaft revolubly and vertically supported therein, a plurality of cutting blades fixed to and radiating from the shaft, a plurality of depressing blades supported on the shaft above the cutting blades, said blades radiating from the shaft in staggered relation respecting the cutting blades, and means supported on the vesesl for imparting a rotary motion to the shaft.

8. A device of the class described comprising a vessel, a shaft revolubly supported within the vessel, a plurality of cutting blades fixed to the shaft and radiating therefrom, a plurality of depressing blades adjustably supported on the shaft above the cutting blades and radiating from said shaft in staggered relation to the cutting blades and means supported on the vessel and connected to the shaft for rotating the same.

In witness whereof we hereunto subscribe our names in the presence of two witnesses.

CLARENCE M. NULF.
GEORGE M. JACKSON.

Witnesses:
WILLIAM R. LAYNE,
CYRUS C. MAYR.